(12) United States Patent
Yokota et al.

(10) Patent No.: US 7,970,708 B2
(45) Date of Patent: Jun. 28, 2011

(54) VALUE INFORMATION MANAGEMENT SYSTEM, RECORDING MEDIUM, PRINTER DEVICE, ACCOUNT ADJUSTING DEVICE, ELECTRONIC DATA PRINTING METHOD, AND COMPUTER PROGRAM

(75) Inventors: Kaoru Yokota, Hyogo (JP); Motoji Ohmori, Osaka (JP); Atsushi Saso, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1093 days.

(21) Appl. No.: 11/547,366

(22) PCT Filed: Mar. 31, 2005

(86) PCT No.: PCT/JP2005/006291
§ 371 (c)(1),
(2), (4) Date: Sep. 29, 2006

(87) PCT Pub. No.: WO2005/096240
PCT Pub. Date: Oct. 13, 2005

(65) Prior Publication Data
US 2007/0214094 A1     Sep. 13, 2007

(30) Foreign Application Priority Data
Apr. 1, 2004 (JP) ................................. 2004-109135

(51) Int. Cl.
*G06F 21/00* (2006.01)
(52) U.S. Cl. ................. 705/57; 705/58; 705/64; 705/67
(58) Field of Classification Search ............... 705/57, 705/58, 64, 67
See application file for complete search history.

(56) References Cited

U.S. PATENT DOCUMENTS

| 6,446,050 B1 * | 9/2002 | Kondo et al. ................ 705/51 |
| 6,738,749 B1 | 5/2004 | Chasko |
| 2002/0052872 A1 * | 5/2002 | Yada ............................... 707/6 |
| 2002/0170973 A1 | 11/2002 | Teraura |
| 2004/0016796 A1 | 1/2004 | Hanna et al. |
| 2004/0039930 A1 * | 2/2004 | Ohmori et al. ............... 713/193 |
| 2006/0120234 A1 * | 6/2006 | Aono et al. .................. 369/47.1 |
| 2006/0170966 A1 * | 8/2006 | Watanabe .................... 358/1.15 |

(Continued)

FOREIGN PATENT DOCUMENTS

EP     1 217 510     6/2002

(Continued)

OTHER PUBLICATIONS

European Search Report issued Mar. 25, 2009 in European Application No. 05727357.5.

*Primary Examiner* — Pierre E Elisca
(74) *Attorney, Agent, or Firm* — Wenderoth, Lind & Ponack, L.L.P.

(57) ABSTRACT

The present invention provides a value information management system capable of printing electronic data (e.g. electronic receipt) representing value information while restricting the electronic receipt to one of printed form and unprinted form so as to prevent fraudulent billing.

A secure memory card 13 securely stores therein a payment-related electronic receipt, a printer 14 prints the electronic receipt, and deletes the electronic receipt from the secure memory card 13 after completion of the printing, and transmits a receipt ID identifying the electronic receipt to a receipt management server 17, so that the receipt management server 17 can manage the electronic receipt identified by the receipt ID as being printed out.

2 Claims, 7 Drawing Sheets

U.S. PATENT DOCUMENTS

2008/0067240 A1* 3/2008 Nakano et al. ................ 235/380
2010/0290793 A1* 11/2010 Kaneko ........................... 399/24

FOREIGN PATENT DOCUMENTS

| | | |
|---|---|---|
| JP | 11-78176 | 3/1999 |
| JP | 2000-099828 | 4/2000 |
| JP | 2000-227979 | 8/2000 |
| JP | 2000-285203 | 10/2000 |
| JP | 2001-310538 | 11/2001 |
| JP | 2002-196921 | 7/2002 |
| JP | 2002-216170 | 8/2002 |
| JP | 2002-312853 | 10/2002 |
| JP | 2002-342546 | 11/2002 |
| JP | 2003-044232 | 2/2003 |
| JP | 2003-203274 | 7/2003 |
| JP | 2003-303276 | 10/2003 |

* cited by examiner

FIG. 3

| RECEIPT ID | TAG ID |
|---|---|
| 2D550084 | — |
| 00176FD2 | 7364FA3B |
| 09653C29 | 3645902B |
| ⋮ | ⋮ |

VALUE INFORMATION MANAGEMENT SYSTEM, RECORDING MEDIUM, PRINTER DEVICE, ACCOUNT ADJUSTING DEVICE, ELECTRONIC DATA PRINTING METHOD, AND COMPUTER PROGRAM

TECHNICAL FIELD

The present invention relates to a value information management system for printing and using electronic data (e.g. electronic receipt) representing value information. The present invention particularly relates to prevention of fraudulent use of printed electronic data.

BACKGROUND ART

Recently, download sales of software and music contents performed via a network has become widespread. In downloading contents, a purchaser connects to a contents sales server via a net work and by using a terminal apparatus such as a personal computer and a PDA (Personal Digital Assistant), and inputs required items relating to payment (e.g. credit card number of the purchaser) according to instructions given on the purchasing screen displayed in the display unit of the terminal apparatus.

After the download completion, the contents sales server transmits an electronic receipt, which has contents corresponding to a paper receipt and is used as proof of purchase in place of a paper receipt, to the terminal apparatus via the network.

An electronic receipt has many advantages over a paper receipt. For example, an electronic receipt can be transmitted easily and promptly from the server via a network and can be stored and read easily at a reception terminal.

In many current cases dealing with receipts, however, only paper receipts are accepted or trusted.

Patent reference 1 discloses a system for printing an electronic receipt on paper for use. In this system, an output control apparatus of receipt data receives from a host apparatus (i.e. server) electronic receipt data being original data according to which printing data and the electronic receipt are generated. After reception of the electronic receipt data, the output control apparatus generates the printing data and the electronic receipt according to the electronic receipt data, and outputs the printing data to a corresponding printer, and the electronic receipt to a corresponding electronic-receipt reception apparatus.

Whenever an electronic receipt becomes necessary again because of loss of the electronic receipt for example, the electronic-receipt reception apparatus is able to obtain the same electronic receipt again from the server via the output control apparatus.

Meanwhile, patent reference 2 discloses a technology for preventing double issuance of an electronic receipt. The patent reference 2 is designed to record, for each piece of sales data, whether an electronic receipt has already been issued for the piece of sales data. When an issuance request of an electronic receipt is received from a user, the technology prevents issuance of the electronic receipt if the electronic receipt has already been issued.

Patent Reference 1:
  Japanese Laid-open patent application No. 2002-312853
Patent Reference 2:
  Japanese Laid-open patent application No. 2003-203274

DISCLOSURE OF THE INVENTION

Problems to be Solved by the Invention

However, both of the above-mentioned systems allow printing of a single electronic receipt more than one time, or permit coexistence between a paper receipt and an electronic receipt in respect to a single purchase. Accordingly, such several receipts for a same purchase can be filed to different destinations for fraudulent use (e.g. counting of necessary expenses or reimbursement of necessary expenses), without being caught out.

In view of the above-stated problem, the present invention aims to provide a value information management system capable of printing electronic data (e.g. electronic receipt) representing value information while preventing the electronic receipt from being used for fraudulent billing.

Means to Solve the Problems

So as to solve the above-stated problem, the present invention provides a value information management system having a recording medium and a printer apparatus, where the recording medium includes: a storage unit securely storing electronic data that represents value information; an instruction reception unit operable to receive an instruction to delete the electronic data; and a deletion unit operable to delete the electronic data when the instruction reception unit has received the deletion instruction, and the printer apparatus includes: a reading unit operable to read the electronic data from the recording medium; a printing unit operable to print the read, electronic data; a detection unit operable to detect that the printing unit has completed the printing; and an instruction transmission unit operable to transmit the deletion instruction to the recording medium when the detection unit has detected the printing completion.

Effects of the Invention

With the stated structure, the value information management system of the present invention is able to restrict the electronic data to one of printed form and electronic form (unprinted form). Therefore, in a case where the electronic data is an electronic receipt, it is possible to prevent coexistence between an electronic receipt and a paper receipt for one purchase, thereby preventing fraudulent billing (e.g. duplicate billing). When the electronic data is a coupon and the like, it is possible to prevent coexistence between an electronic coupon and a paper coupon, thereby preventing multiple use of one coupon.

Into the above structure, incorporation of such a structure is also possible in which the value information management system further has a value information management apparatus, the electronic data includes data identification information identifying the electronic data, the printer apparatus further includes: an identification-information transmission unit operable to, when the detection unit has detected the printing completion, extract the data identification information from the electronic data relating to the printing, and transmit the extracted data identification information to the value information management apparatus, and the value information management apparatus includes: a state storage unit storing one or more combinations of storage-data identification information and state information, each state information indicating a printing state of electronic data identified by corresponding storage-data identification information; an identification-information obtaining unit operable to obtain the data identification information transmitted from the identification-information transmission unit of the printer apparatus; and a changing unit operable to change state information that is stored in the state storage unit and corresponds to the obtained data identification information, to indicate that corresponding printing has been completed.

With the stated structure, the value information management apparatus realizes centralized management of electronic data as to whether the electronic data has already been printed or not.

The value information management apparatus may further include: a confirmation inquiry reception unit operable to receive a state confirmation inquiry, the state confirmation inquiry including inquiry-data identification information and inquiring about a state of electronic data identified by the inquiry-data identification information; a state obtaining unit operable to, when receiving the state confirmation inquiry, obtain, from the state storage unit, state information corresponding to the inquiry-data identification information; and a response unit operable to transmit the obtained state information to a transmission source of the state confirmation inquiry.

With the stated structure, the value information management apparatus is able to respond to an inquiry of another apparatus as to whether the electronic data has been printed or not, without fail. In turn, the other apparatus is able to know whether the electronic data has been printed or not, without fail.

A recording medium of the present invention has: a storage unit securely storing electronic data that represents value information; an instruction reception unit operable to receive an instruction to delete the electronic data; and a deletion unit operable to delete the electronic data when the instruction reception unit has received the deletion instruction.

With the stated structure, when a deletion instruction is received, it is possible to delete corresponding electronic data representing value information.

Accordingly, if the recording medium is used together with a printer apparatus that reads the electronic data from the recording medium, prints the read electronic data, and thereafter transmits a deletion instruction of the electronic data, it is possible to restrict the electronic data to one of printed form and unprinted form. Therefore, in a case where the electronic data is an electronic receipt, it is possible to prevent coexistence between an electronic receipt and a paper receipt for one purchase, thereby preventing fraudulent billing (e.g. duplicate billing). When the electronic data is a coupon and the like, it is possible to prevent coexistence between an electronic coupon and a paper coupon, thereby preventing multiple use of one coupon.

The recording medium may further have: a permission unit operable to, when the electronic data has been read by a printer apparatus, permit the electronic data to be re-read only if the printer apparatus having read the electronic data is requesting the re-reading before the instruction reception unit has received the deletion instruction.

With the stated structure, it is possible to restrict re-reading of electronic data so that only an apparatus having performed the initial reading is able to perform the re-reading and that prior to reception of a deletion instruction directed to the electronic data.

For example, when a printer apparatus has failed in printing due to a paper jam or lack of ink, the printer apparatus is able to read the same electronic data again for printing. In addition, the stated structure disables the electronic data in case where the recording medium is disconnected from the printer apparatus after the printing completion and before the recording medium obtains the deletion instruction from the printer apparatus. This helps restrict the electronic data to one of printed form and unprinted form.

The present invention also provides a printer apparatus for printing electronic data that represents value information, the printer apparatus having: a reading unit operable to read the electronic data from a recording medium storing the electronic data; a printing unit operable to print the read electronic data; a detection unit operable to detect that the printing unit has completed the printing; and an instruction transmission unit operable to transmit a deletion instruction to the recording medium when the detection unit has detected the printing completion, the deletion instruction instructing the recording medium to delete the electronic data.

With the stated structure, after electronic data representing value information is read from the recording medium and printed, it is possible to delete the electronic data, thereby helping restrict the electronic data to one of printed from and unprinted form.

Into the above structure, incorporation of such a structure is also possible in which the printer apparatus may further have: a management-information transmission unit, where the electronic data includes data identification information identifying the electronic data, and the management-information transmission unit, when the detection unit has detected the printing completion, extracts the data identification information from the electronic data relating to the printing, and transmits management information including the extracted data identification information to a value information management apparatus managing a printing state of electronic data.

With the stated structure, only data identification information that identifies electronic data whose printing has been completed is transmitted to the value information management apparatus. As a result, the value information management apparatus is able to determine electronic data whose printing has been completed. This realizes centralized management of electronic data as to whether the electronic data has already been printed or not.

The printer apparatus may further have: a writing unit, where the printing unit prints the electronic data to a medium, the medium being provided with a storage device including a storage area, and the writing unit writes the data identification information to the storage area.

Into the above structure, incorporation of such a structure is also possible in which the storage device is an IC tag, and the writing unit performs the writing with use of wireless communication.

With the stated structures, it is possible to store data identification information to a medium to which the electronic data has already been printed.

Accordingly, an original medium to which the printer apparatus has printed electronic data is distinguishable from a duplicate of the original medium.

The printer apparatus may further have an obtaining unit, where the IC tag contains tag identification information uniquely identifying the IC tag, the obtaining unit obtains the tag identification information from the IC tag with use of wireless communication, and the management information transmitted from the management-information transmission unit further includes the obtained tag identification information.

With the stated structure, the printer apparatus transmits tag identification information and data identification information only when printing of the electronic data has been completed. Accordingly, the value information management apparatus is able to pursue management as to whether the electronic data has already been printed, using a combination of data identification information and tag identification information (e.g. determines that the electronic data has already been printed only when tag identification information corresponding to received data identification information is in storage).

The printer apparatus may further have: an encryption unit operable to encrypt value identification information containing the tag identification information and the data identification information; a barcode generating unit operable to generate barcode information that corresponds to the encrypted value identification information; and a barcode printing unit operable to print a barcode corresponding to the generated barcode information, to the medium.

With the stated structure, only a combination of tag identification information and data identification information, which relates to electronic data whose printing has been completed, is able to be recorded to a medium in the barcode format. Accordingly, after reading of the tag identification information in the barcode format and the tag identification information that the IC tag retains, if the read pieces of tag identification information match, it proves that the corresponding medium is a medium that the printer apparatus has printed the electronic data. On the other hand if the read pieces of tag identification information do not match, the corresponding medium turns out to be a duplicate made using a photocopier and the like.

The detection unit may detect that the printing unit has completed the printing upon completion of ejection of the medium.

With the stated structure, deletion of electronic data is performed after confirming completion of ejection of the medium.

Therefore, suppose a case where the medium is paper and the printer apparatus has undergone paper jam during paper ejection, to tear down the paper. In such a case, the structure prevents deletion of the corresponding electronic data.

Into the above structure, incorporation of such a structure is also possible in which the electronic data includes layout information relating to layout of characters and graphics to be printed, and the printing unit performs the printing according to the layout information.

With the stated structure, an issuer of an electronic receipt is able to decide the printing layout to be adopted in printing into a paper receipt.

The present invention also provides a reimbursement apparatus for processing reimbursement, having: a request acquiring unit operable to acquire a reimbursement request for processing reimbursement relating to data that represents value information; an obtaining unit operable to, when the request acquiring unit has acquired the reimbursement request, obtain data identification information identifying the data; a transmission unit operable to transmit a state confirmation inquiry that includes the obtained data identification information to a value information management apparatus managing a printing state of data; a reception unit operable to receive state information indicating a printing state of the data; and a rejection unit operable to judge whether the reimbursement request is valid based on the state information, and reject the reimbursement request when judging in the negative.

Into the above structure, incorporation of such a structure is also possible in which the data identification information is printed on a medium on which the value information has been printed, the obtaining unit obtains the data identification information from the medium, and the rejection unit judges in the negative when the state information indicates that the printing of the data has not been completed.

Into the above structure, incorporation of such a structure is also possible in which the medium contains an IC tag, the IC tag stores therein the data identification information, and the obtaining unit obtains the data identification information with use of wireless communication.

Into the above structure, incorporation of such a structure is also possible in which the data representing the value information is electronic data that contains the data identification information identifying the data, the obtaining unit obtains the data identification information from the electronic data, and the rejection unit judges in the negative when the state information indicate that the printing of the data has been completed.

According to the stated structure, it becomes possible to perform reimbursement processing only for a valid reimbursement request.

The present invention also provides an electronic data printing method used in a printer apparatus for printing electronic data representing value information, the electronic data printing method having: a reading step of reading the electronic data from a recording medium storing the electronic data; a printing step of printing the read electronic data; a detection step of detecting completion of the printing performed in the printing step; and an instruction transmission step of transmitting a deletion instruction to the recording medium when the printing completion has been detected in the detection step, the deletion instruction instructing the recording medium to delete the electronic data.

The present invention also provides a computer program used in a printer apparatus for printing electronic data representing value information, the computer program making the printer apparatus perform: a reading step of reading the electronic data from a recording medium storing the electronic data; a printing step of printing the read electronic data; a detection step of detecting completion of the printing performed in the printing step; and an instruction transmission step of transmitting a deletion instruction to the recording medium when the printing completion has been detected in the detection step, the deletion instruction instructing the recording medium to delete the electronic data.

The present invention also provides a computer-readable recording medium storing therein the above-stated computer program.

With the stated structures, when electronic data, which represents value information and is stored in a recording medium, is read and printed, the electronic data is deleted. Therefore it becomes possible to restrict the electronic data to one of printed form and unprinted form.

BRIEF DESCRIPTION OF THE DRAWINGS

FIG. 3 is a diagram showing one example of a receipt management database stored in a receipt management server of the present invention.

DESCRIPTION OF CHARACTERS

1 Electronic Receipt Management System
11 Sales Server
12 Mobile Terminal
13 Secure Memory Card
14 Printer
15 Special-purpose sheet
16 Reimbursement Apparatus
17 Receipt Management Server
18 Card Management Server
101 Network Communication Unit
102 SSL Processing Unit
103 Cryptographic Unit
104 Memory Communication Unit
105 Printer Communication Unit
106 Operation Reception Unit
107 Control Unit
111 Input/Output Unit
112 Cryptographic Unit
113 Control Unit
114 Storage Unit
115 TRM
121 Input/Output Unit
122 Control Unit
123 Signature Verification Unit
124 Printing Unit
125 Wireless Communication Unit
126 Network Communication Unit
131 IC Tag

BEST MODE FOR CARRYING OUT THE INVENTION

As follows, an embodiment of the present invention is described with reference to related drawings.

Figure 1:
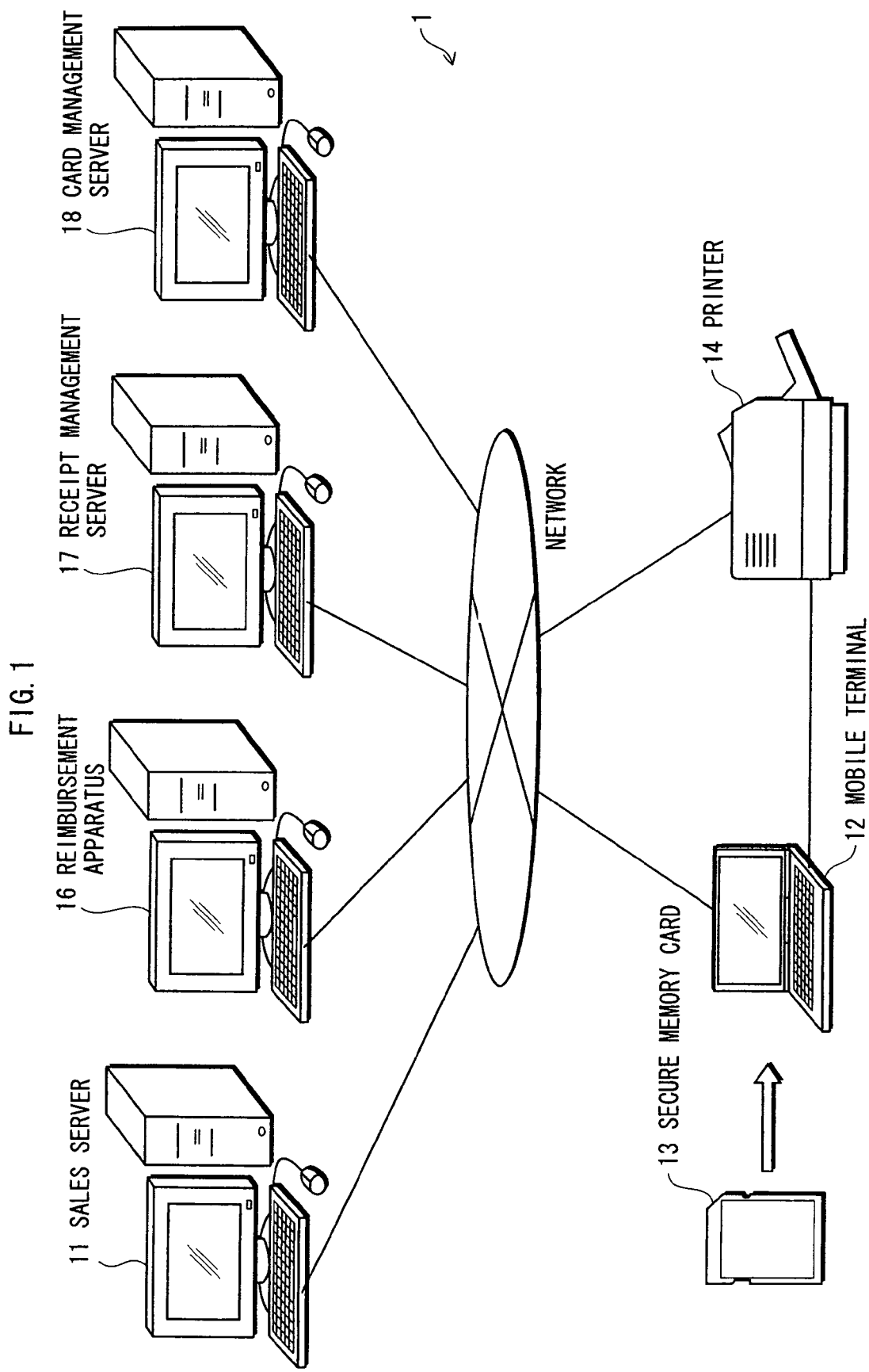
FIG. 1 is a diagram illustrating an overview of a structure of an electronic receipt management system according to one embodiment of the present invention.

FIG. 1 is a diagram illustrating an overall of a structure of an electronic receipt management system 1 according to one embodiment of the present invention.

A sales server 11 provides download sales service of software and the like, and a mobile terminal 12 corresponds to a client that purchases software by means of download via a network.

The mobile terminal 12 transmits a software-download request to the sales server 11.

The software-download request contains payment information concerning payment for the software (e.g. card number and expiration date information of a credit card).

The sales server 11 asks a card management server 18 about the validity of the credit card, by transmitting the card number and the expiration date information. The sales server 11 permits the download sales only when the credit card has been confirmed to be valid based on the response from the card management server 18.

When the download sales is permitted by the sales server 11, the mobile terminal 12 acquires the software and a corresponding electronic receipt from the sales server 11, and stores the software and the electronic receipt in a secure memory card 13 inserted in a card slot of the mobile terminal 12.

The printer 14 is connected to the mobile terminal 12 via a USB (universal serial bus) connection. If requested by the mobile terminal 12, the printer 14 prints out the contents of the electronic receipt into a paper receipt.

A reimbursement apparatus 16 receives an electronic receipt from the mobile terminal 12, and inquires of a receipt management server 17 whether the electronic receipt has already been printed out into a paper receipt.

The receipt management server 17 manages states of the electronic receipt, e.g. whether the electronic receipt has already been outputted as a paper receipt. The receipt management server 17 responds to the inquiry about the electronic receipt, by giving the status of the electronic receipt.

An electronic receipt is sometimes used as electronic information (i.e. in the form as it is), but is sometimes printed out on paper and used in the form of paper receipt. In view of this, the electronic receipt management system 1 pursues management so that coexistence between electronic receipt and paper receipt does not occur for one purchase.

The following explains one example where an electronic receipt is used in the form of electronic information. Suppose that a user of the mobile terminal 12 works for a company that owns the reimbursement apparatus 16. The user has purchased software in urgent needs by downloading it from the sales server 11 using the credit card of the user. In a later day, the user transmitted a corresponding electronic receipt to the reimbursement apparatus 16, so as to get reimbursed from the company for the software expense.

On the other hand, an example in which the electronic receipt is printed out as a paper-receipt before being used is that the user of the mobile station 12 purchases software by downloading it, receives an electronic receipt for the payment, prints out the received electronic receipt into a paper receipt, and affixes the paper receipt to an official document as proof of necessary expense.

<1. Structure>
<1.1 Sales Server 11>

The sales server 11 provides download sales service of software and the like. Specifically, the sales server 11 is a computer system made up of a CPU (Central Processing Unit), a ROM (Read Only Memory), a RAM (Random Access Memory), a hard disk, a network interface, and so on. Here, the ROM stores a computer program. By operation of the CPU according to the computer program, the sales server 11 achieves its function.

The sales server 11 receives a software-download request from a client via a network.

The software-download request contains software identification information identifying software to be purchased, and information about a credit card owned by the client (e.g. a card number and expiration date information).

SSL (Secure Sockets Layer) is used where communication has to be pursued in secrecy (e.g. where the communication deals with information about the credit card).

For detailed information about SSL, please refer to a Japanese translation of "Secure Electronic Commerce: Building the Infrastructure for Digital Signatures and Encryption" written by Warwick Ford and Michael Baum, and translated by Yamada Shinichiro, Second version, p. 130-p. 134, Oct. 10, 2001, Pearson Education Japan (ISBN: 4894715120), for example.

The sales server 11 transmits the information about the credit card, which includes the card number and the expiration date information, to the card management server 18, for checking the validity of the credit card.

The sales server 11 permits the software downloading to the mobile station 12, only when the response from the card management server 18 indicates the validity of the credit card.

After completion of the software downloading, the sales server 11 transmits an electronic receipt to the client. The electronic receipt includes receipt information comprised of: a receipt ID identifying the electronic receipt, information about a person responsible for the issuance of the receipt, information about the expense amount of the purchased software, and item information of the purchased software. In addition, the electronic receipt includes an electronic signature generated from the receipt information.

In advance, the sales server 11 generates a public key and a secret key in a pair, and retains the secret key therein. The sales server 11 generates the electronic signature by computing a hash value of (i.e. hashing) the receipt information, and encrypts the computed hash value using the secret key.

In addition, the sales server 11 notifies the receipt management server 17 of the receipt ID, upon issuance of the electronic receipt.

<1.2 Mobile Terminal 12>

Figure 2:
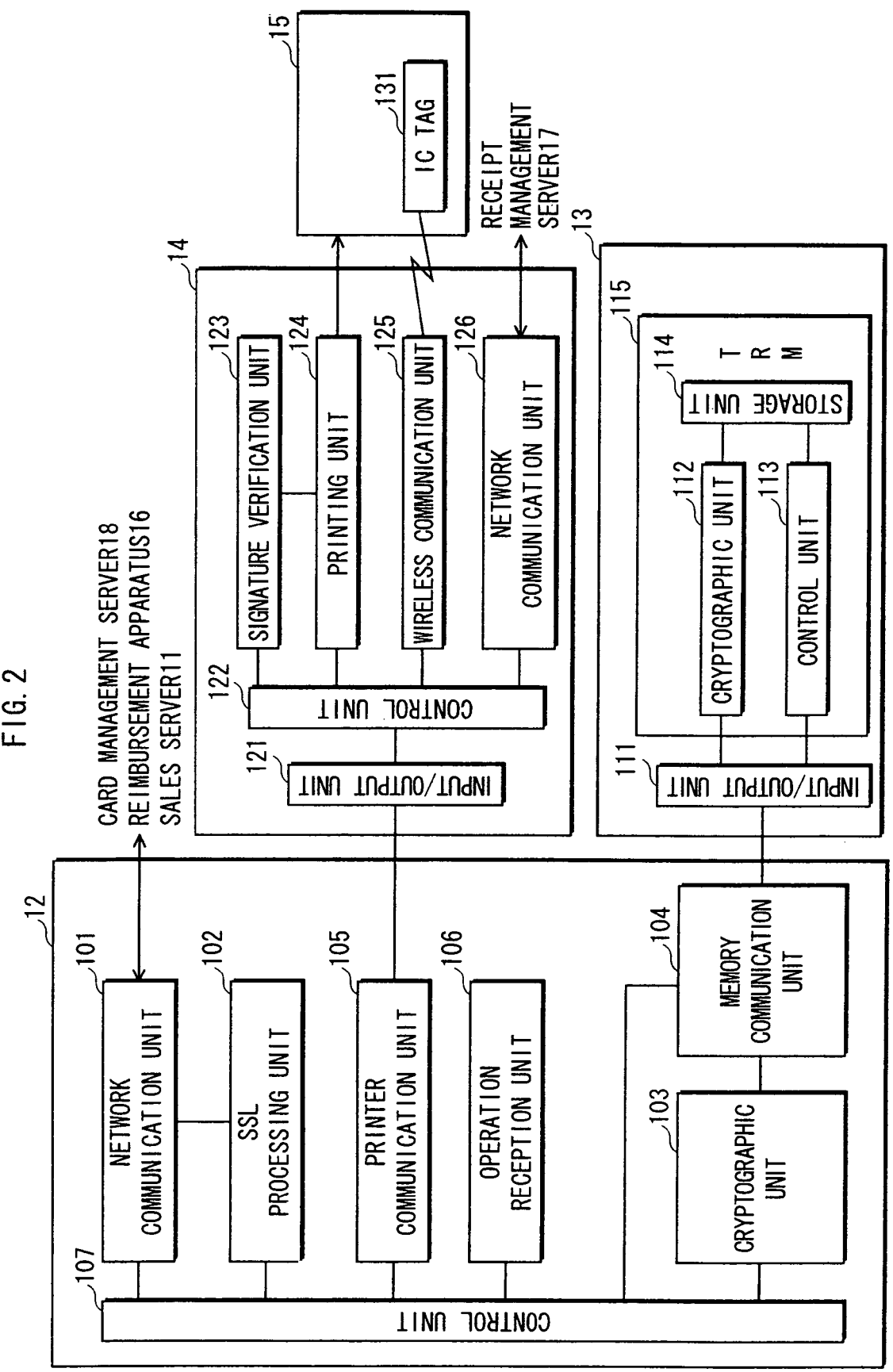
FIG. 2 is a block diagram showing a structure of a mobile terminal, a secure memory card, a printer, and a special-purpose sheet, which relate to one embodiment of the present invention.

FIG. 2 is a block diagram showing the structure of the mobile terminal 12, the secure memory card 13, the printer 14, and the special-purpose sheet 15.

The mobile terminal 12 is specifically a computer system made up of a CPU, a ROM, a RAM, a liquid crystal display, a keypad, a communication interface, a card slot, and the like. Here, the ROM stores a computer program. By operation of the CPU according to the computer program, the mobile terminal 12 achieves its function.

The network communication unit 101 communicates with the sales server 11, the reimbursement apparatus 16, and the card management server 18, via a network.

However in the case where SSL has to be used in communication between the sales server 11 and the mobile terminal 12, the network communication unit 101 performs the communication in corporation with SSL processing unit 102 that performs processing relating to SSL.

As necessary, the cryptographic unit 103 encrypts the data that is to be transmitted to the secure memory card 13 via the memory communication unit 104. The cryptographic unit 103 decrypts the data received from the secure memory card 13 via the memory communication unit 104.

The cryptographic unit 103 performs the encryption and the decryption according to a CPRM (Content Protection for Recordable Media) system employed in the SD memory card standards. However, it is possible to perform the encryption and the decryption according to other systems than the CPRM system.

In this regard, "Matsushita Technical Journal, Vol. 48, No. 2 (April 2002) p. 4-p. 10, by Matsushita Electric Industrial Co. Ltd." provides detailed explanation of the CPRM system.

The memory communication unit 104 communicates with the secure memory card 13.

The printer communication unit 105 communicates with the printer 14 via the USB (Universal Serial Bus) cable.

The operation reception unit 106 receives an instruction performed by a user using a keypad (not shown in the drawing) of the mobile terminal 12, and notifies the control unit 107 of the contents of the instruction.

The control unit 107 controls the entire operation of the mobile terminal 12.

Upon reception of a software-purchase instruction from the operation reception unit 106, the control unit 107 instructs SSL processing unit 102 to transmit the software-purchase request to the sales server 11. SSL processing unit 102 transmits the software-purchase request to the sales server 11 via the network communication unit 101 using SSL.

When having received a download permission notification from the sales server 11 via the network communication unit 101 and SSL communication unit 102, the control unit 107 downloads the software from the sales server 11 via the network communication unit 101 and SSL processing unit 102.

The control unit 107 receives an electronic receipt from the sales server 11 via the network communication unit 101 and SSL processing unit 102, and writes the electronic receipt to the secure memory card 13 via the cryptographic unit 103 and the memory communication unit 104.

When the operation reception unit 106 has received a printing instruction including a receipt ID as a parameter, the control unit 107 reads an electronic receipt corresponding to the receipt ID from the secure memory card 13 via the cryptographic unit 103 and the memory communication unit 104, and transmits the read electronic receipt and the printing request to the printer 14.

When the printer communication unit 105 has received a printing completion notification, the control unit 107 transmits an instruction to delete the electronic receipt that relates to the printing, via the memory communication unit 104.

<1.3 Secure Memory Card 13>

The secure memory card 13 is specifically a memory card equipped with an IC (Integrated Circuit), a ROM, a RAM, etc. The secure memory card 13 is connected to the mobile terminal 12 by being inserted to the card slot of the mobile terminal 12.

The input/output unit 111 communicates with the mobile terminal 12.

The cryptographic unit 112 uses the CPRM system, both in encrypting data to be transmitted to the mobile terminal 12 via the input/output unit 111 and in decrypting data received from the mobile terminal 12.

When an instruction received by the control unit 113 from the mobile terminal 12 via the input/output unit 111 and the cryptographic unit 112 is a data write instruction, the control unit 113 writes the data relating to the data write instruction to the storage unit 114. On the other hand, when the received instruction is a data read instruction, the control unit 113 performs control so as to read the data relating to the data write instruction from the storage unit 114, and to transmit the read data to the mobile terminal 12 via the input/output unit 111 and the cryptographic unit 112. When the received instruction is a deletion instruction, the control unit 113 performs control so as to delete the data relating to the deletion instruction.

Under the control by the control unit 113, the storage unit 114 stores data (e.g. an electronic receipt and software) according to a data write instruction of the mobile terminal 12, and transmits data to the mobile terminal 12 via the cryptographic unit 112 and the input/output unit 111, according to a data read instruction of the mobile terminal 12.

The TRM 115 is a tamper resistant module, in which the cryptographic unit 112, the control unit 113, and the storage unit 114 are placed.

<1.4 Printer 14 and Special-purpose sheet 15>

The printer 14 is specifically a computer system made up of a CPU, a ROM, a RAM, a laser beam output unit, a toner module, a communication interface, a card slot, and the like. Here, the ROM stores a computer program. By operation of the CPU according to the computer program, the printer 14 achieves its function.

The input/output unit 121 performs data communication with the mobile terminal 12, via the USB cable.

The control unit 122 receives a printing instruction with a corresponding electronic receipt from the mobile terminal 12 via the input/output unit 121, and instructs the signature verification unit 123 to verify the electronic signature included in the electronic receipt.

When the validity of the electronic signature has been confirmed by the signature verification unit 123, the control unit 122 issues the following instructions to respective units: a printing instruction of the receipt information to the printing unit 124; a read instruction of a tag ID and a write instruction of a receipt ID to the wireless communication unit 125; and a transmission instruction of the receipt ID and the tag ID to the network communication unit 126.

The signature verification unit 123 retains a public key regarding the sales server 11 in advance, and judges the validity of the electronic signature included in the electronic receipt received by the input/output unit 121 upon reception of the verification instruction issued by the control unit 122, and notifies the control unit 122 of the judgment result.

The signature verification unit 123 compares: data obtained by decrypting, using the public key, the electronic signature included in the electronic receipt; and data obtained by hashing the receipt information included in the electronic receipt. When the two pieces of data match, the signature verification unit 123 judges that the electronic signature is valid.

The printing unit 124 includes a semiconductor laser beam output module, a toner module, a paper feed/eject module, and the like, and prints, onto a special-purpose sheet 15 to which an IC tag is affixed, receipt information comprised of the electronic receipt's receipt ID, information about the person responsible for the issuance of the receipt, information about the expense amount of the purchased software, and item information of the purchased software.

In addition, if the electronic receipt includes layout data such as a receipt design, a manner of shading, and the like, the printing unit 124 follows the layout data in pursuing the printing.

In accordance with the write instruction issued by the control unit 122, the wireless communication unit 125 communicates with the IC tag 131 affixed to the special-purpose sheet 15, and writes to the storage area of the IC tag 131 the receipt ID of the electronic receipt concerning the printing pursued by the printing unit 124.

In the present example, the IC tag is equipped with a nonvolatile storage area having the size of 4 bytes, however the size of the storage area is not limited 4 bytes.

The network communication unit 126 transmits the receipt ID and the tag ID to the receipt management server 17 via the network, in accordance with the transmission instruction issued by the control unit 122.

<1.5 Reimbursement Apparatus 16, Receipt Management Server 17, and Card Management Server 18>

The reimbursement apparatus 16, the receipt management server 17, and the card management server 18 are respectively a computer system (e.g. personal computer and work station) that is made up of a CPU, a ROM, a RAM, a hard disk, a network interface, and the like, where the ROM stores a computer program. The reimbursement apparatus 16, the receipt management server 17, and the card management server 18 achieves their function by operation of their CPU according to their computer program stored in their ROM.

When receiving an electronic receipt from the mobile terminal 12, the reimbursement apparatus 16 transmits an inquiry request, which includes the receipt ID of the electronic receipt, to the receipt management server 17, thereby inquiring about whether the electronic receipt has already been printed into a paper receipt.

When it is confirmed that the printing has not been performed yet, the reimbursement apparatus 16 performs reimbursement processing so as to reimburse the user of the mobile terminal 12 for the amount of money regarding the electronic receipt (e.g. depositing the amount of money regarding the electronic receipt to the pre-registered bank account of the user).

The reimbursement apparatus 16 also deals with reimbursement regarding a paper receipt.

In advance, the reimbursement apparatus 16 reads the money amount information on the paper receipt using an OCR (Optical Character Recognition) technology or the like, and retains the money amount information.

Needless to say, the money amount information may be obtained by methods other than the reading using the OCR technology. For example, the following method is possible. That is, the receipt ID and the money amount information therefor are retained in the receipt management server 17 in advance, and the reimbursement apparatus 16 asks the receipt management server 17 about the money amount information based on the receipt ID.

The reimbursement apparatus 16 includes a wireless communication unit operable to communicate with an IC tag. By performing wireless communication, the reimbursement apparatus 16 reads the tag ID and the receipt ID from the IC tag affixed to the paper receipt, and transmits a paper-receipt confirmation inquiry, which includes the tag ID and the receipt ID, to the receipt management server 17, so as to inquire about whether the paper receipt is valid or not.

When a response to the paper-receipt confirmation inquiry indicates the validity of the paper receipt, the reimbursement apparatus 16 performs reimbursement processing so as to reimburse the owner of the paper receipt for the amount of money regarding the paper receipt (e.g. depositing the amount of money regarding the paper receipt to the pre-registered bank account of the user).

Here in any of the cases where the receipt ID cannot be read, where the receipt ID corresponds to an invalid value determined in advance, and where the response to the paper-receipt confirmation indicates the invalidity of the paper receipt, the reimbursement apparatus 16 judges that the paper receipt is a duplicate has been generated using a color photocopier or a photocopier, and does not perform the reimbursement processing.

The receipt management server 17, when having obtained a combination of receipt ID and tag ID from the printer 14, stores the combination to the storage area of the hard disk, for example, as part of the receipt management database. When having received a receipt ID from the sales server, the receipt management server 17 stores the receipt ID, which is not accompanied with a tag ID, to the receipt management database.

FIG. 3 is a diagram showing one example of the receipt management database stored in the receipt management server 17.

The receipt management server 17, when having received the inquiry information, responds to the inquiring party by informing "paper receipt" as a receipt type when a tag ID is registered in correspondence with the receipt ID. When there is no such tag ID, the receipt management server 17 informs the inquiring party of "electronic receipt". When there is no registration of the receipt ID at all, the receipt management server 17 informs the inquiring party of "invalid receipt".

In addition, when the receipt management server 17 has received a paper-receipt confirmation inquiry, which includes a tag ID and a receipt ID, from the reimbursement apparatus 16, and if the combination of the tag ID and the receipt ID is stored in the receipt management database, the receipt management server 17 transmits a response indicating the validity of the paper receipt to the reimbursement apparatus 16. When on the contrary the combination is not stored in the receipt management database, the receipt management server 17 transmits a response indicating the invalidity of the paper receipt to the reimbursement apparatus 16.

The card management server 18 performs management relating to credit cards. The card management server 18 retains, in the form of database, card numbers each of which is associated with its status, where the status indicates whether the credit card is valid or not.

When the card management server 18 has received a card-validity confirmation inquiry, which includes a card number, and if the card number exists in the data base and the status of the corresponding credit card is indicated as "valid", the card management server 18 responds to the inquiring party by informing about the validity. On the contrary if the status is indicated as "invalid", the card management server 18 informs about the invalidity.

<2. Processing>

The electronic receipt management system 1 manages information so that coexistence between an electronic receipt and a paper receipt for one purchase will never happen.

As follows, the three types of processing relating to the stated management are described sequentially, where the three types of processing are specifically: (1) processing performed by the mobile terminal 12 for downloading software from the sales server 11; (2) processing performed by the mobile terminal 12 for printing a paper receipt with use of the printer 14; and (3) processing performed by the reimbursement apparatus 16 for confirming that no paper receipt has been issued, so as to allow usage of a corresponding electronic receipt as it is.

<2.1 Software Purchase Processing>

Figure 4:
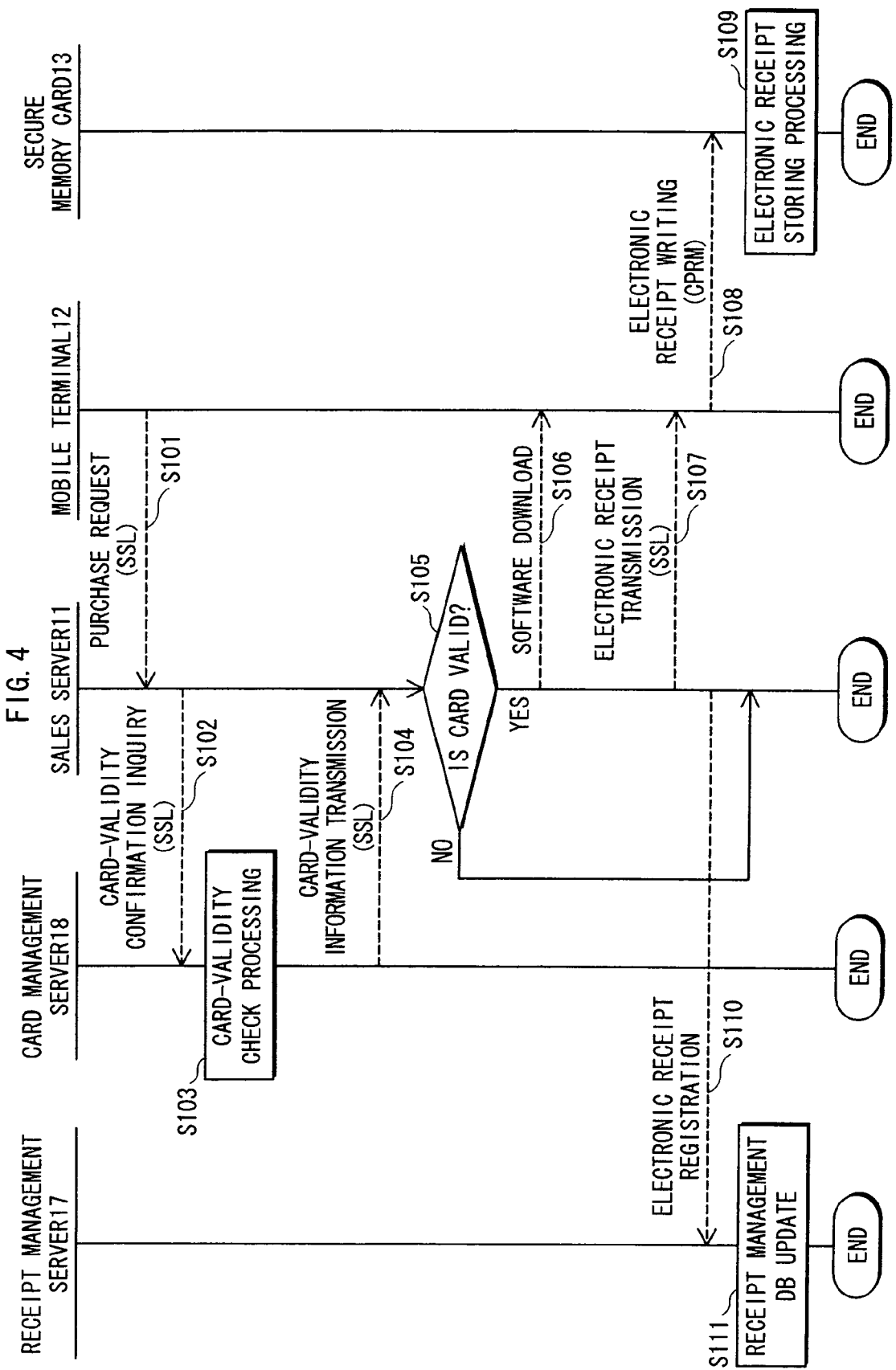
FIG. 4 is a flowchart showing a processing procedure performed for purchasing software, according to one embodiment of the present invention.

FIG. 4 is a flowchart showing a processing procedure performed for purchasing software.

The mobile terminal 12 transmits a software-purchase request to the sales server 12 using SSL (Step S101).

The software-purchase request includes software identification information identifying the software to be purchased, and information about a credit card owned by a purchaser (a card number and expiration date information).

The sales server 11 transmits a card-validity confirmation inquiry, which includes the card number and the expiration date information, to the card management server 18 using SSL (Step S102).

The card management server 18 checks the validity of the credit card of the card umber, by checking the card number and the expiration date information against the retained database (Step S103).

The card management server 18 transmits card-validity information, which includes the card number and card-status information indicating the validity of the credit card, to the sales server 11 using SSL (Step S104).

The sales server 11 receives the card-validity information. When the card-status information of the received card-validity information indicates "invalid" (Step S105:NO), the processing ends.

When on the contrary the card-status information indicates "valid" (Step S105:YES), the sales server 11 transmits a download permission notification to the mobile terminal 12. The mobile terminal 12 in turn downloads the software, according to the download permission notification, from the sales server 11 (Step S106).

After completion of downloading the software, the sales server 11 transmits an electronic receipt using SSL to the secure memory card 13 (Step S107).

The mobile terminal 12 transmits the received electronic receipt to the secure memory card 13 according to the CPRM system (Step S108).

The secure memory card 13 stores the received electronic receipt to the storage area (Step S109).

The sales server 11 transmits an electronic-receipt registration request, which includes a receipt ID relating to the issued electronic receipt, to the receipt management server 17 (Step S110).

The receipt management server 17 registers the receipt ID included in the electronic-receipt registration request to the receipt management database (Step S111).

Since there is no tag ID associated with the receipt ID, the receipt management server 17 only performs registration of the receipt ID.

<2.2 Electronic Receipt Printing Processing>

Figure 5:
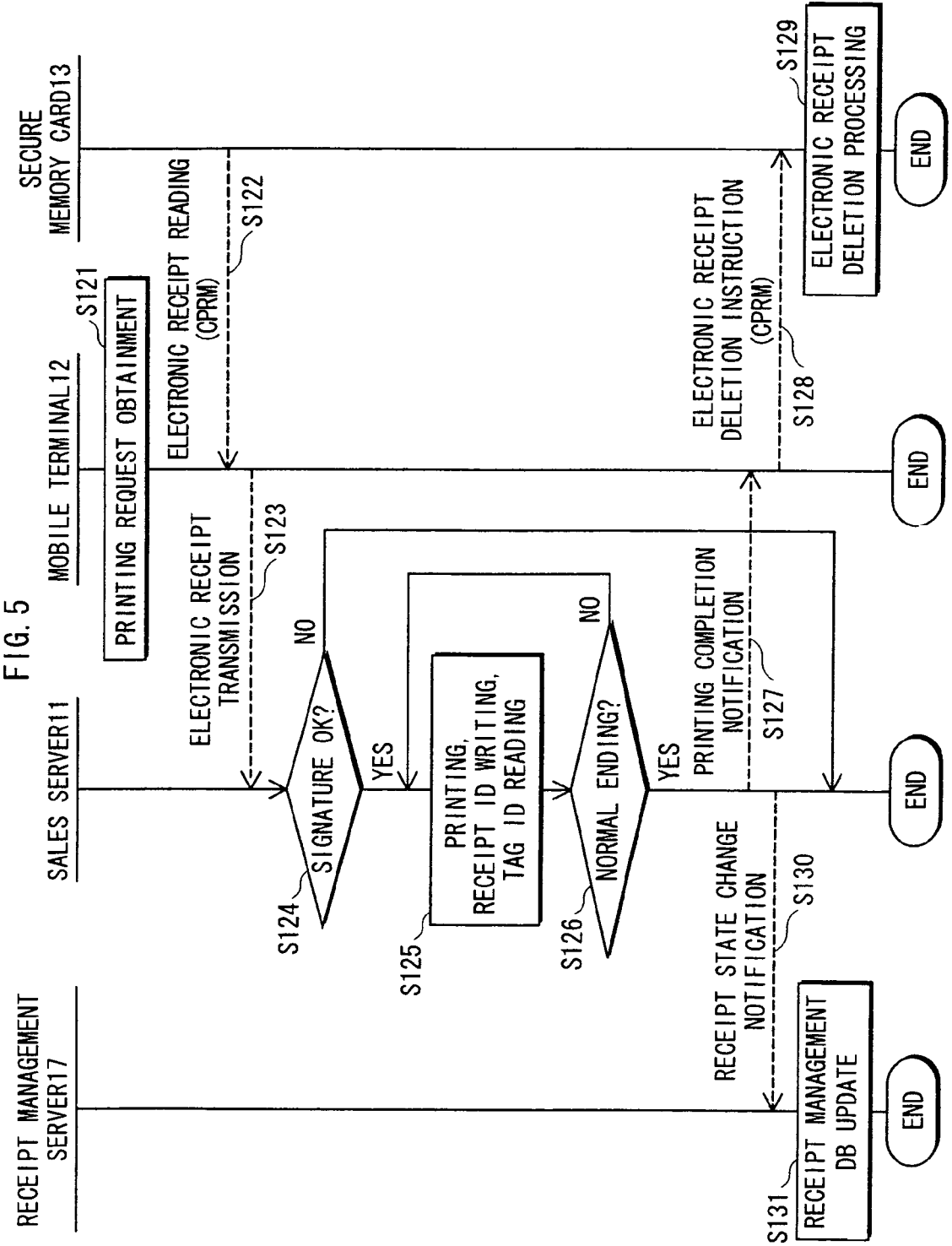
FIG. 5 is a flowchart showing a printing procedure of an electronic receipt, according to one embodiment of the present invention.

FIG. 5 is a flowchart showing a printing procedure of an electronic receipt.

The mobile terminal 12 obtains the receipt ID of the electronic receipt to be printed, from a user of the mobile terminal 12 via a keypad (not shown in the drawing) of the mobile terminal 12 (Step S121).

The mobile terminal 12 reads the electronic receipt corresponding to the obtained receipt ID, from the secure memory card 13 according to the CPRM system (Step S122).

The mobile terminal 12 transmits the read electronic receipt to the printer 14 (Step S123).

The printer 14, in turn, verifies the electronic signature included in the received electronic receipt (Step S124).

When the electronic receipt is invalid (Step S124:NO), the processing ends.

When the electronic receipt is valid (Step S124:YES), the printer 14 prints the electronic receipt to the special-purpose sheet, and then via wireless communication, reads the tag ID of the IC tag affixed to the special-purpose sheet and writes the receipt ID to the storage area of the IC tag (Step S125).

When any of the printing and the writing of the receipt ID has been ended abnormally in Step S125 (Step S126:NO), the operation of Step S125 is repeated.

When both the printing and the writing of the receipt ID are confirmed to have been ended normally (Step S126:YES), the printer 14 transmits a printing completion notification to the mobile terminal 12 (Step S127).

The mobile terminal 12 issues a deletion instruction to the secure memory card 13, so as to instruct the secure memory card 13 to delete the electronic receipt relating to the printing completion notification (Step S128).

The secure memory card 13 deletes the electronic receipt, whose deletion has been instructed by means of the deletion instruction, from the storage area (Step S129).

In addition, the printer 14 transmits a receipt state change notification to the receipt management server 17 (Step S130).

The receipt state change notification includes the receipt ID, the status indicating the value of "0" which represents "paper", and the read tag ID.

The receipt management server 17 updates the receipt management database according to the received receipt state change notification (Step S131).

<2.3 Inquiry about the Receipt State>

The reimbursement apparatus 16 asks whether a paper receipt has been issued with respect to the electronic receipt obtained from the mobile terminal 12.

Figure 6:
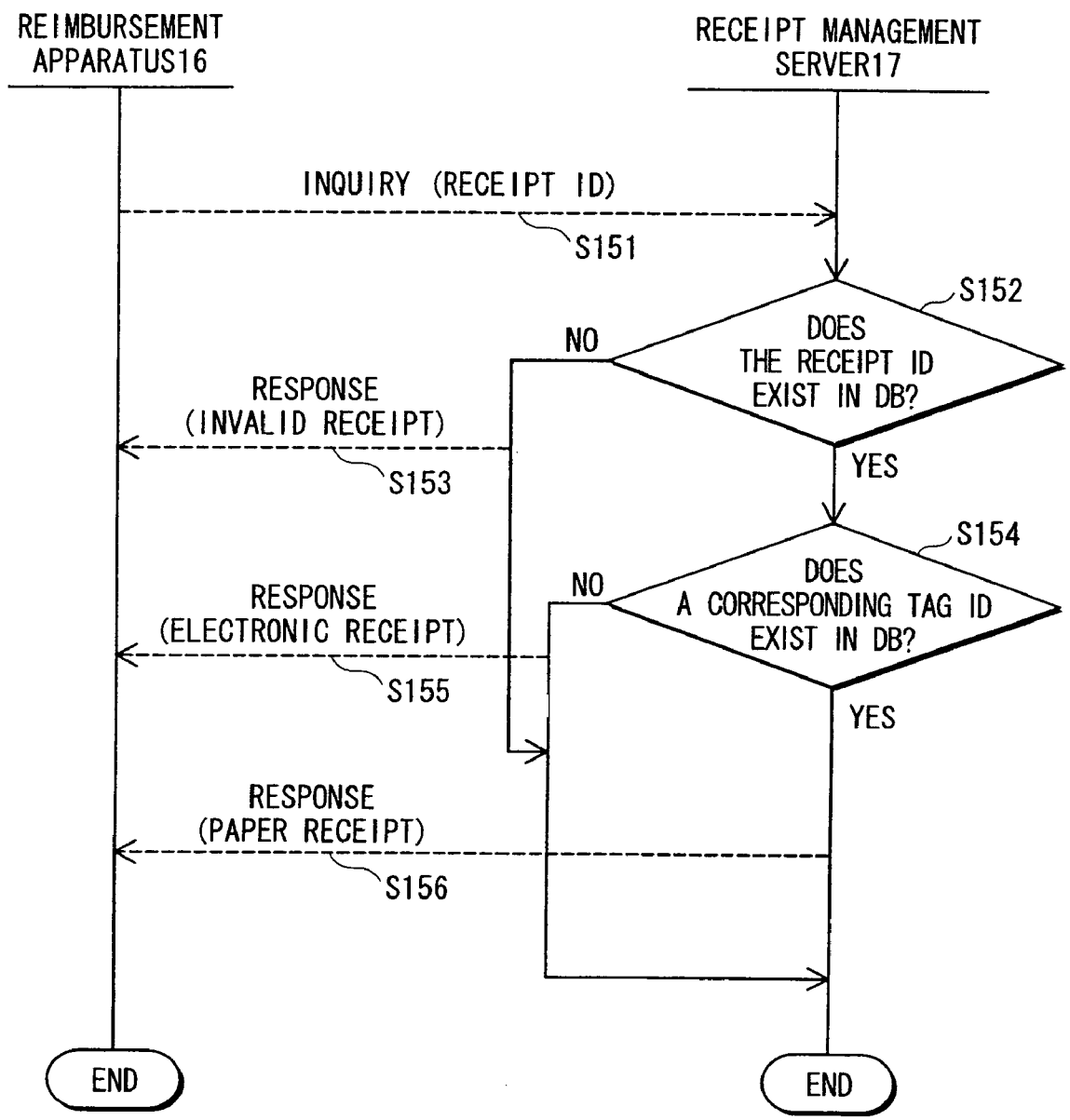
FIG. 6 is a flowchart showing a procedure of judging whether a paper receipt has been issued with respect to an electronic receipt according to one embodiment of the present invention.

FIG. 6 is a flowchart showing a procedure of judging whether a paper receipt has been issued with respect to the electronic receipt.

The reimbursement apparatus 16 transmits a receipt ID to the receipt management server 17 (Step S151).

The receipt management server 17 receives the receipt ID, and judges whether the same ID as the received receipt ID exists in the receipt management database (Step S152).

When the judgment of Step S152 results in the negative (Step S152:NO), the receipt management server 17 transmits a response indicating "invalid receipt" to the reimbursement apparatus 16, and ends the processing (Step S153).

When the judgment of Step S152 results in the affirmative (Step S152:YES), then the receipt management server 17 judges whether there exists a tag ID corresponding to the receipt ID in the receipt management database (Step S154).

When the judgment of Step S154 results in the negative (Step S154:NO), the receipt management server 17 transmits a response indicating "electronic receipt" to the reimbursement apparatus 16, and ends the processing (Step S155).

When the judgment of Step S154 results in the affirmative (Step S154:YES), the receipt management server 17 transmits a response indicating "paper receipt" to the reimbursement apparatus 16, and ends the processing (Step S156).

<3. Modification Examples>

So far, the present invention has been-described by way of the above embodiment. However needless to say, the present invention should not be limited to the stated embodiment, and can be varied within the scope of the present invention. Examples of the possible modifications are as follows:

(1) In the embodiment, the network communication unit 126 in the printer 14 transmits the receipt ID and the tag ID, in accordance with the instruction from the control unit 122, to the receipt management server 17 via the network. However, the control unit 122 may instruct the network communication unit 126 to transmit only the receipt ID, so that the network communication unit 126 will transmit only the receipt ID to the receipt management server 17 accordingly.

In this case, the receipt management server 17 will store only the receipt ID of the receipt whose printing has been complete, to the storage area, as part of a new database. In this structure, the receipt management server 17, when it has received an inquiry information from an apparatus, will respond to the inquiring party by informing "paper receipt" as the receipt type when the new receipt management database has an entry of the receipt ID, or by informing "electronic receipt" as the receipt type when the new receipt management database does not have an entry of the receipt ID.

In addition, the following structure is alternatively possible.

When having issued an electronic receipt, the sales server 11 transmits a receipt ID of the issued electronic receipt to the receipt management server 17.

The receipt management server 17 stores in the hard disk the receipt ID in association with state information indicating whether printing of the electronic receipt of the receipt ID has already been performed or not.

To be more specific, when having received a receipt ID from the sales server 11, the receipt management server 17 will store the receipt ID in association with state information indicating that printing of the corresponding electronic receipt has not been performed yet.

When having received from the printer 14 the same receipt ID as the receipt ID stored in the hard disk, the receipt management server 17 changes the corresponding state information in the hard disk to indicate that the printing has already been performed.

When the receipt management server 17 has received from an apparatus a confirmation inquiry, which includes a receipt ID and is for asking whether the corresponding electronic receipt has already been printed into paper, the receipt management server 17 transmits the state information of the received receipt ID having been stored in the hard disk, to the inquiring apparatus.

(2) In the embodiment, the printer 14 obtains an electronic receipt from the mobile terminal 12 via a USB cable. However, another structure is also possible in which the printer 14 is provided with a card slot to which the secure memory card 13 can be inserted, so as to directly read the stored contents (e.g. electronic receipt) of the mobile terminal 12.

In this structure, after normal ending of the printing of the electronic receipt, the printer 14 will delete the corresponding electronic receipt from the secure memory card 13.

In addition, the secure memory card 13 may further be equipped with a unit for performing wireless communication, which enables the printer 14 to obtain electronic receipt from the secure memory card 13 through wireless communication between the printer 14 and the secure memory card 13.

(3) In the embodiment, an electronic receipt is deleted after the contents of the electronic receipt has been printed. However, it is possible to disable use of the electronic receipt by assigning "use-disabled mark" or the like to the corresponding electronic receipt within the card before the printing, so as to prevent the memory card from being ejected before transmission of the deletion instruction after the printing completion. This would further help prevent any fraudulent use of the electronic receipt.

The electronic receipt once assigned a use-disable mark, or the like, is prohibited from being read from the secure memory card 13 except for rare cases such as where the printer 14 is requesting a re-transmission of the data. The secure memory card 13 receives a deletion instruction from the printer 14 via the mobile terminal 12 when the printing of the printer 14 has ended normally, thereby deleting the data.

(4) The receipt management server 17 may be omitted from the structure of the electronic receipt management system 1.

In this case, too, an electronic receipt and a paper receipt will not coexist for one purchase. However it becomes impossible to pursue centralized receipt management or realize inquiry about whether each receipt has been already printed or still remains as the electronic form.

(5) The reimbursement apparatus 16 may be equipped with a signature verification unit for verifying the signature on the electronic receipt.

In this case, the reimbursement apparatus 16 acquires in advance the public key that is generated by the sales server 11 and pertains to the sales server 11, so as to enable the signature verification unit to pursue verification of the electronic signature.

(6) When the printer 14 has read the electronic receipt, the secure memory card 13 may delete the electronic receipt at the discretion of the secure memory card 13. Alternatively, the printer 14 may issue a deletion instruction to the secure memory card 13 after printing of the electronic receipt.

(7) When the secure memory card 13 has received a re-read instruction to read an electronic receipt again, after the electronic receipt has been once read out but before a deletion instruction directed to the electronic receipt is received, the secure memory card 13 may ignore the re-read instruction if the apparatus having issued the re-read instruction is not the apparatus having issued the initial read instruction.

So as to realize such a structure, a read instruction should include some identifier identifying an apparatus having issued the read instruction.

(8) The printer 14 may print to a special-purpose sheet 15 a barcode generated based on encrypted ID information generated by encrypting ID information that includes a receipt ID and a tag ID.

As follows, this modification example is detailed focusing on the difference with the stated embodiment.

Figure 7:
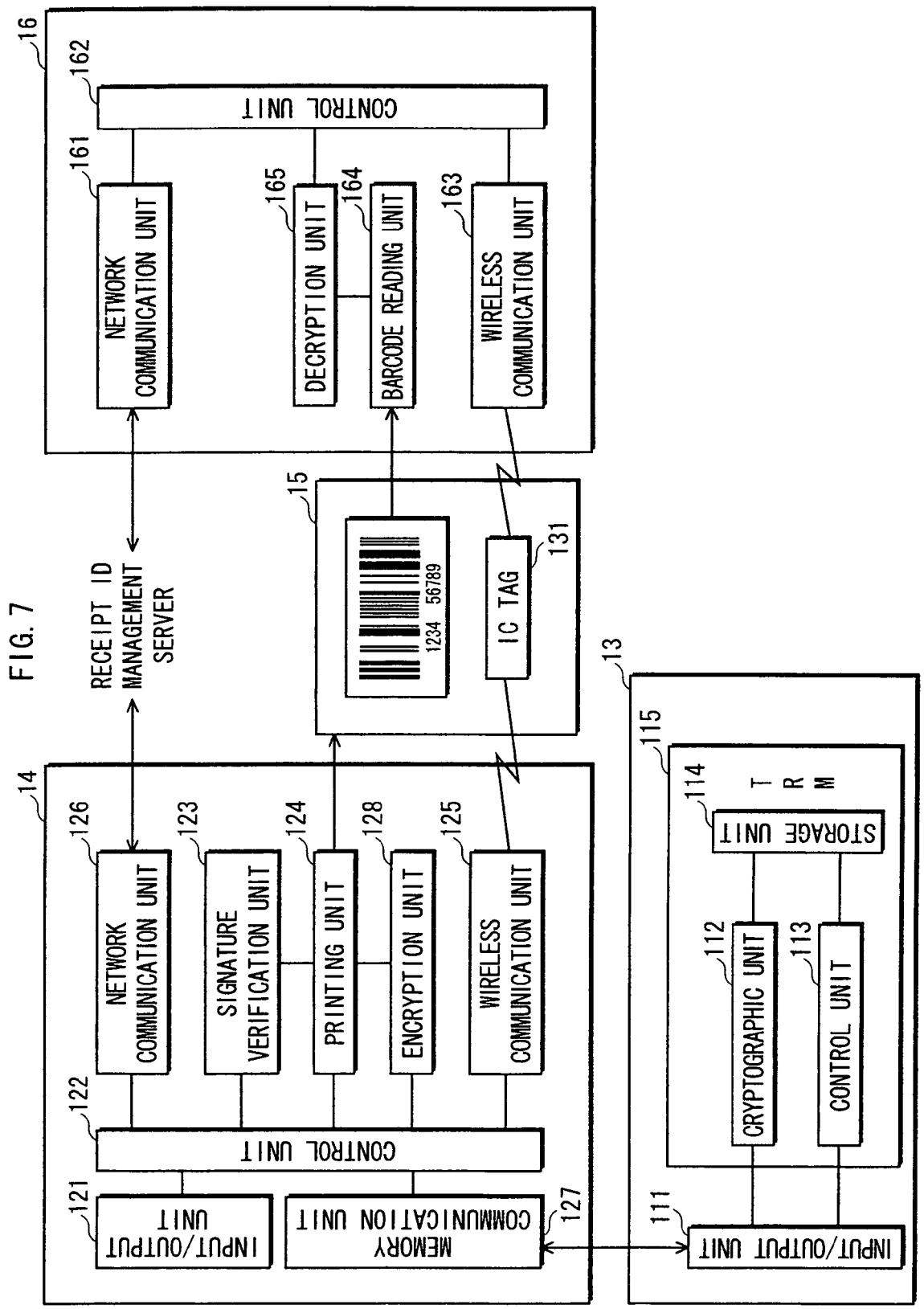
FIG. 7 is a block diagram showing an overview of a main structure of a modification example of one embodiment of the present invention.

FIG. 7 is a block diagram showing the structure of the present modification example.

The memory communication unit 127 communicates with the input/output unit 111 of the secure memory card 13.

The encryption unit 128 generates encrypted ID information generated by encrypting ID information that includes a receipt ID and a tag ID of an electronic receipt.

The printing unit 124 prints the contents of the electronic receipt, and prints to the special-purpose sheet 15 the contents of the encrypted ID information, in the form of barcode.

The reimbursement apparatus 16 includes a wireless communication unit 163 that communicates with the IC tag 131, and a barcode reading unit 164 that reads the barcode printed on the special-purpose sheet 15.

The decryption unit 165 obtains ID information by decrypting the encrypted ID information that has been read by the barcode reading unit 164. The control unit 162 judges whether the tag ID included in the ID information matches the tag ID read by the wireless communication unit 163, and transmits the combination of the receipt ID and the tag ID, which are included in the ID information, as inquiry information, to the receipt management server 17.

Upon reception of the inquiry information, the receipt management server 17 responds to the inquiring party by informing "paper receipt" as the receipt type if the tag ID that corresponds to the receipt ID included in the inquiry information has been registered in its receipt management database, responds by informing "electronic receipt" if the corresponding tag ID has not been registered in the receipt management database, and responds by informing "invalid receipt" if the registration of the receipt ID has not been found at all in the receipt management database.

When the response from the receipt management server 17 indicates "paper receipt", the reimbursement apparatus 16 performs reimbursement processing so as to reimburse the user of the mobile terminal 12 for the amount of money regarding the electronic receipt (e.g. depositing the amount of money regarding the electronic receipt to the pre-registered bank account of the user).

When the response from the receipt management server 17 indicates other than "paper receipt", the reimbursement apparatus 16 does not performs the stated reimbursement processing at all.

(9) In the stated embodiment, a receipt ID is made to be stored in the storage area of the IC tag affixed to a printing sheet, as protection measures against duplication of a paper receipt by means of photocopy and the like. However the protection measures is not limited to this. Such duplication is also prevented by printing a barcode or a numerical value, which represent a receipt ID, on paper directly.

Other possible measures against such duplication are, for example: using special ink for printing a receipt ID thereby generating an original distinguishable from a duplicate; and writing by engraving the receipt ID on a printing sheet.

It is more over possible to prevent such duplication by affixing a contact type IC to a printing sheet, and to record a receipt ID in the storage area of the contact type IC.

In this case, the printer apparatus will be equipped with a writing unit operable to write data to the storage area by being connected to the IC.

(10) The above-stated embodiment only explains printing of information of an electronic receipt in to a paper receipt. However, the present invention is not limited to this usage.

For example, the present invention may be used in printing an electronic value, being information about value, into a coupon, a beer coupon, a discount ticket, and a ticket, which are vulnerable to invalid use by duplication.

In addition, it is not limited to paper on which printing is directed. In fact, other media than paper, such as a plastic sheet, a metal sheet, glass, vinyl may be used.

(11) The present invention may be a method described above.

The present invention may alternatively be a computer program realizing the method by means of a computer. Still alternatively, the present invention may be a digital signal made of the computer program.

The present invention may be the computer program or the digital signal, in the form recorded in a computer readable recording medium, where the computer readable recording medium is for example: a flexible disc, a hard disk, a CD-ROM (Compact Disc Read Only Memory), an MO (Magneto Optic Disc), a DVD (Digital Versatile disc), a DVD-ROM (Digital Versatile Disc Read Only Memory), a DVD-RAM (Digital Versatile Disc Random Access Memory), a BD (Blu-ray Disc), and a semiconductor memory. In addition, the present invention may be any of these recording media storing therein the computer program or the digital signal.

The present invention may also have such a structure that the stated computer program or the stated digital signal is conveyed over a network represented by an electronic communication circuit, wireless/wired communication circuits, and the Internet.

In addition, the present invention may be a computer system equipped with a microprocessor and a memory, where the memory stores therein the computer program, and the microprocessor operates according to the computer program.

In addition, the present invention may also be realized by another separate computer system by conveying the program or the digital signal by recording them in any of the stated examples of recording medium, or by conveying the program or the digital signal over any of the stated examples of network.

(12) Part or all of the constituting elements of each of the above-stated apparatuses may be composed of one system LSI (Large Scale Integration). A system LSI is a super multifunctional LSI manufactured by integrating a plurality of constituting parts on one chip. The system LSI is specifically a computer system composed of a microprocessor, a ROM, a RAM, and the like. Here, the RAM stores a computer program. By operation of the microprocessor according to the computer program, the system LSI achieves its function.

(13) The present invention may be a combination of any of the embodiment and the modification examples.

INDUSTRIAL APPLICABILITY

The value information management system of the present invention is applicable as a fundamental technology for an electronic commerce system that uses electronic money and the like.

The recording medium, the printer apparatus, and the reimbursement apparatus, which relate to the present invention, are manufacturable and sellable by manufacturers of the digital home appliances, personal computers, printer apparatuses, and the like.

The invention claimed is:

1. A value information management system comprising: a non-transitory recording medium; a printer apparatus; and a value information management apparatus, wherein the non-transitory recording medium includes:
    a storage unit for securely storing electronic data representing value information;
    an instruction reception unit operable to receive an instruction to delete the electronic data; and
    a deletion unit operable to delete the electronic data when the instruction reception unit receives the deletion instruction, and wherein the printer apparatus includes:
    a reading unit operable to read the electronic data from the non-transitory recording medium;
    a printing unit operable to print the read electronic data;
    a detection unit operable to detect that the printing unit has completed the printing; and
    an instruction transmission unit operable to transmit the deletion instruction to the non-transitory recording medium when the detection unit detects that the printing unit has completed the printing, wherein the electronic data includes data identification information for identifying the electronic data, wherein the printer apparatus further includes:
    an identification-information transmission unit operable to, when the detection unit detects that the printing unit has completed the printing, extract the data identification information from the electronic data relating to the printing, and transmit the extracted data identification information to the value information management apparatus, and wherein the value information management apparatus includes:
    a state storage unit for storing one or more combinations of storage-data identification information and state information, each piece of state information indicating a printing state of electronic data identified by a corresponding piece of storage-data identification information;
    an identification-information obtaining unit operable to obtain the data identification information transmitted by the identification-information transmission unit of the printer apparatus; and
    a changing unit operable to change state information corresponding to the obtained data identification information stored in the state storage unit to indicate that a corresponding printing has been completed.

2. The value information management system of claim 1, wherein the value information management apparatus further includes:
    a confirmation inquiry reception unit operable to receive a state confirmation inquiry, the state confirmation inquiry including inquiry-data identification information and inquiring about a state of electronic data identified by the inquiry-data identification information;
    a state obtaining unit operable to, when receiving the state confirmation inquiry, obtain, from the state storage unit, state information corresponding to the inquiry-data identification information; and
    a response unit operable to transmit the obtained state information to a transmission source of the state confirmation inquiry.

* * * * *